(12) United States Patent
Kurz (10) Patent No.: US 11,488,352 B1
(45) Date of Patent: Nov. 1, 2022

(54) MODELING A GEOGRAPHICAL SPACE FOR A COMPUTER-GENERATED REALITY EXPERIENCE

(71) Applicant: Apple Inc., Cupertino, CA (US)

(72) Inventor: Daniel Kurz, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 138 days.

(21) Appl. No.: 16/747,063

(22) Filed: Jan. 20, 2020

Related U.S. Application Data (60) Provisional application No. 62/808,406, filed on Feb. 21, 2019.

(51) Int. Cl.
| | | |
|---|---|---|
| *G06T 17/05* | (2011.01) | |
| *G06K 9/62* | (2022.01) | |
| *G06T 7/55* | (2017.01) | |

(52) U.S. Cl.
CPC .............. *G06T 17/05* (2013.01); *G06K 9/628* (2013.01); *G06K 9/6215* (2013.01); *G06K 9/6256* (2013.01); *G06T 7/55* (2017.01)

(58) Field of Classification Search
CPC . G06T 2207/20084; G06T 7/70; G06N 20/00; G06N 3/08
See application file for complete search history.

(56) References Cited

U.S. PATENT DOCUMENTS

| | | | | |
|---|---|---|---|---|
| 2014/0133756 A1* | 5/2014 | Bergboer | ................ | G06T 11/60 382/190 |
| 2015/0161476 A1* | 6/2015 | Kurz | .................... | G06K 9/6202 382/190 |
| 2017/0243400 A1* | 8/2017 | Skidmore | ............. | G06T 19/006 |
| 2018/0253621 A1* | 9/2018 | Banerjee | ............. | G06K 9/4642 |
| 2020/0218690 A1* | 7/2020 | Huston | ................... | G06T 19/20 |
| 2020/0410713 A1* | 12/2020 | Auer | ......................... | G06T 7/11 |

* cited by examiner

*Primary Examiner* — Ross Varndell
(74) *Attorney, Agent, or Firm* — Fernando & Partners, LLP (57) ABSTRACT

Various implementations disclosed herein include devices, systems, and methods for modeling a geographical space for a computer-generated reality (CGR) experience. In some implementations, a method is performed by a device including a non-transitory memory and one or more processors coupled with the non-transitory memory. In some implementations, the method includes obtaining a set of images. In some implementations, the method includes providing the set of images to an image classifier that determines whether the set of images correspond to a geographical space. In some implementations, the method includes establishing correspondences between at least a subset of the set of images in response to the image classifier determining that the subset of images correspond to the geographical space. In some implementations, the method includes synthesizing a model of the geographical space based on the correspondences between the subset of images.

25 Claims, 8 Drawing Sheets

MODELING A GEOGRAPHICAL SPACE FOR A COMPUTER-GENERATED REALITY EXPERIENCE

CROSS REFERENCE TO RELATED APPLICATIONS

This application claims priority to U.S. patent application No. 62/808,406, filed on Feb. 21, 2019, which is hereby incorporated by reference in its entirety.

TECHNICAL FIELD

The present disclosure generally relates to a computer-generated reality (CGR) experience, and, in particular, to modeling a geographical space for a CGR experience.

BACKGROUND

Virtual reality (VR) and augmented reality (AR) are becoming more popular due to their remarkable ability to alter a user's perception of the world. For example, VR and AR are used for learning purposes, gaming purposes, content creation purposes, social media and interaction purposes, or the like. These technologies differ in the user's perception of his/her presence. VR transposes the user into a virtual space so that a VR perception of the user is different from a real-world perception of the user. In contrast, AR adds something to the user's real-world perception.

These technologies are becoming more commonplace due to, for example, miniaturization of hardware components, improvements to hardware performance, and improvements to software efficiency. As one example, a user may experience VR content by using a head-mounted device (HMD) that encloses the user's field-of-view and is tethered to a computer. As another example, a user may experience AR content by wearing an HMD that enables the user to see his/her surroundings (e.g., glasses with optical see-through features). As yet another example, a user may experience on a handheld display (e.g., an AR-enabled mobile phone or tablet) AR content superimposed on a live video feed of the user's environment.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for modeling a geographical space for a computer-generated reality (CGR) experience. In some implementations, a method is performed by a device including a non-transitory memory and one or more processors coupled with the non-transitory memory. In some implementations, the method includes obtaining a set of images. In some implementations, the method includes providing the set of images to an image classifier that determines whether the set of images correspond to a geographical space. In some implementations, the method includes establishing correspondences between at least a subset of the set of images in response to the image classifier determining that the subset of images correspond to the geographical space. In some implementations, the method includes synthesizing a model of the geographical space based on the correspondences between the subset of images.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Providing a CGR experience of a geographical space sometimes requires a model of the geographical space. Synthesizing a model of a geographical space based on captured images often includes establishing correspondences between the images. Establishing correspondences between two images includes identifying features that are common to both the images. Establishing correspondences is sometimes referred to as performing a correspondence search. Performing a correspondence search is a resource-intensive operation. For example, correspondence searches are computationally-intensive and/or time-intensive operations. As such, performing a correspondence search between two or more images with few or no common features results in unnecessary usage of computing resources.

The present disclosure provides methods, devices, and/or systems for synthesizing a model of a geographical space utilizing less resources. An image classifier determines whether a set of images correspond to a geographical space. If the image classifier indicates that two images correspond to the same geographical space, then a correspondence search is performed between the two images. However, if the image classifier indicates that that two images do not correspond to the same geographical space, then a correspondence search is not performed between the two images. Performing correspondence searches on images that likely correspond to the same geographical space and forgoing correspondence searches on images that likely do not correspond to the same geographical space tends to reduce the computing resources and/or the time utilized to synthesize a model of the geographical space.

Figure 1:
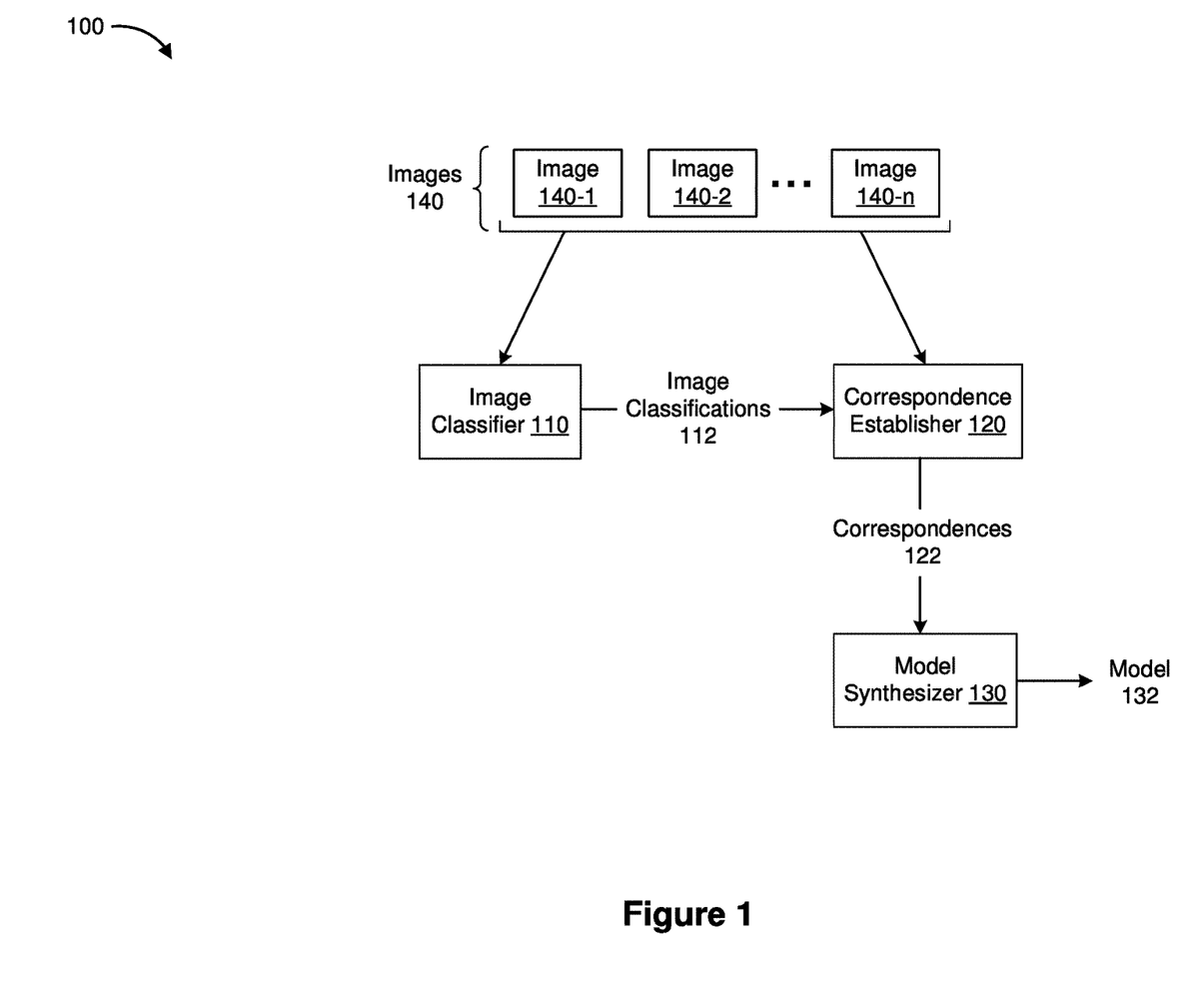
FIG. 1 is a block diagram of an example operating environment in accordance with some implementations.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes an image classifier 110, a correspondence establisher 120, and a model synthesizer 130.

In various implementations, the image classifier 110 obtains images 140 (e.g., a first image 140-1, a second image 140-2 . . . an nth image 140-n). The image classifier 110 determines whether the images 140 correspond to a geographical space. In some implementations, the image classifier 110 classifies the images 140 into one or more image classifications 112. In some implementations, each image classification 112 corresponds to a respective geographical space. In some implementations, the image classifier 110 groups the images 140 based on the geographical spaces to which the images 140 correspond. For example, the image classifier 110 groups a first subset of the images 140 into a first image classification that corresponds to living room images and a second subset of the images 140 into a second image classification that corresponds to bedroom images.

In various implementations, the image classifier 110 includes a neural network that classifies the images 140. In some implementations, the neural network is trained with training data that includes labeled image pairs. For example, during a training phase, the neural network is provided a pair of images and a corresponding label indicating whether or not the pair of images correspond to the same geographical space. In some implementations, the neural network includes a long short-term memory (LSTM) recurrent neural network (RNN).

In some implementations, the image classifier 110 utilizes classification similarity learning. In such implementations, the image classifier 110 is trained to determine whether a pair of images are within a degree of similarity. In some implementations, the pair of images are similar if the pair of images are captured in the same room. In some implementations, the image classifier 110 obtains two images as input, and outputs a value that indicates whether the two images are within a degree of similarity. For example, in some implementations, the image classifier 110 outputs a first value (e.g., '1') if the images are within a degree of similarity, and a second value (e.g., '0') if the images are not within the degree of similarity.

In various implementations, the correspondence establisher 120 establishes correspondences 122 between a subset of the images 140 that correspond to the same geographical space. In some implementations, the correspondence establisher 120 obtains the image classifications 112 from the image classifier 110. In some implementations, the image classifications 112 indicate a subset of the images 140 that correspond to the same geographical space. In such implementations, the correspondence establisher 120 establishes the correspondences 122 between the subset of the images 140 that correspond to the same geographical space. In some implementations, the image classifications 112 indicate a subset of the images 140 that do not correspond to the same geographical space. In such implementations, the correspondence establisher 120 forgoes establishing correspondences between the subset of the images 140 that do not correspond to the same geographical space. In some implementations, by forgoing establishing correspondences between the subset of the images 140 that do not correspond to the same geographical space, the correspondence establisher 120 utilizes fewer computing resources to generate the correspondences 122. In some implementations, by forgoing establishing correspondences between the subset of the images 140 that do not correspond to the same geographical space, the correspondence establisher 120 generates the correspondences 122 in a smaller amount of time.

In some implementations, the image classifier 110 utilizes regression similarity learning. In such implementations, the image classifier 110 learns a function that determines whether a pair of images are within a degree of similarity. In some implementations, the image classifier 110 determines a value that indicates a probability that the images were captured in the same geographical area (e.g., same room). In some implementations, the image classifier 110 obtains two images as input, and outputs a value indicating a probability that the two images were captured in the same geographical area (e.g., in the same room). In some implementations, the value ranges from 0 to 1.

In some implementations, the image classifications 112 include probability values for various subsets of the images 140 (e.g., the image classifications 112 include probability values for each image pair). In such implementations, the probability value for a particular subset of the images 140 indicates a likelihood that the subset of the images 140 correspond to the same geographical space. In some implementations, the correspondence establisher 120 establishes the correspondences 122 between a particular subset of the images 140 if the probability value for that particular subset satisfies a threshold (e.g., if the probability value is higher than the threshold). In some implementations, the correspondence establisher 120 forgoes establishing correspondences between a particular subset of the images 140 if the probability value for that particular subset breached a threshold (e.g., if the probability value if lower than the threshold). In some implementations, by forgoing establishing correspondences between the subset of the images 140 with a probability value that breaches the threshold, the correspondence establisher 120 utilizes fewer computing resources to generate the correspondences 122. In some implementations, by forgoing establishing correspondences between the subset of the images 140 with a probability value that breaches the threshold, the correspondence establisher 120 generates the correspondences 122 in a smaller amount of time.

In various implementations, the correspondence establisher 120 establishes the correspondences 122 between a subset of the images 140 by performing a correspondence search between the subset of the images 140. In some implementations, performing a correspondence search on a subset of the images 140 includes identifying common or similar elements between the subset of the images 140 (e.g., identifying visual elements that are present in each one of the subset of the images 140). In some implementations, the correspondence establisher 120 utilizes methods, devices, and/or systems associated with image processing in order to identify common elements between a subset of the images 140.

In some implementations, the correspondence establisher 120 establishes the correspondences 122 between the subset of the images 140 by detecting, describing, and matching local features (e.g., point features or keypoints) in the subset of the images 140. In some implementations, the correspondence establisher 120 utilizes one or more feature detectors to detect the local features. In some implementations, the correspondence establisher 120 utilizes edge detectors such as Canny, Deriche, Differential, Sobel, Prewitt, or Roberts cross to detect the local features. In some implementations, the correspondence establisher 120 utilizes corner detectors such as Harris operator, Shi and Tomasi, Level curve curvature, Hessian feature strength measures, SUSAN and/or FAST to detect the location features. In some implementations, the correspondence establisher 120 utilizes blob detectors such as Laplacian of Gaussian (LoG), Difference of Gaussians (DoG), Determinant of Hessian (DoH), maximally stable external regions and/or PCBR. In some implementations, the correspondence establisher 120 utilizes affine invariant feature detectors such as Affine shape adaptation, Harris affine and/or Hessian affine.

In some implementations, the correspondence establisher 120 utilizes feature descriptors such as Scale-invariant feature transform (SIFT), Speeded up robust features (SURF), Gradient Location and Orientation Histogram (GLOH), Histogram of oriented gradients (HOG), Binary Robust Independent Elementary Features (BRIEF), Oriented FAST and rotated BRIEF (ORB), Fast Retina Keypoint (FREAK), Binary Robust Invariant Scalable Keypoints (BRISK) and/or Daisy.

In some implementations, the correspondence establisher 120 utilizes feature matching such as nearest neighbor search using Euclidean distance between descriptors and/or Hamming distance between descriptors.

In various implementations, the model synthesizer 130 synthesizes a model 132 of a geographical space based on the correspondences 122 established by the correspondence establisher 120. In some implementations, synthesizing the model 132 includes utilizing the correspondences 122 in order to identify boundaries of the geographical space. In some implementations, synthesizing the model 132 includes utilizing the correspondences 122 in order to determine placement of objects within the geographical space. In some implementations, the model 132 is used to present a CGR experience for a user. For example, in some implementations, a CGR experience is synthesized based on the model 132, so that the CGR experience is within a degree of similarity of the geographical space represented by the model 132.

In some implementations, the model synthesizer 130 utilizes methods, devices and/or systems associated with Structure from Motion (SfM), Simultaneous Localization and Mapping (SLAM), Depth from Stereo and/or Multiview Stereo to synthesize the model 132. In some implementations, the model synthesizer 130 estimates a matrix (e.g., an essential matrix and/or a fundamental matrix) associated with an image pair. In some implementations, the model synthesizer 130 utilizes an eight-point algorithm to estimate the matrix. In some implementations, the model synthesizer 130 estimates the camera poses and the structure of the scene using triangulation. In some implementations, the model synthesizer 130 adjusts the estimates (e.g., using non-linear optimization) in order to reduce a reprojection error.

In some implementations, the image classifier 110 utilizes embedding learning. In some implementations, the image classifier 110 learns an embedding that maps images to a space in which images of the same room are proximate to each other and image of different rooms are farther away from each other. In such implementations, the image classifier 110 obtains an image as input, and outputs an n-dimensional embedding vector. In some implementations, the image classifier 110 utilizes thresholding or clustering to determine which images were taken in the same room based on their embedding vectors.

In some implementations, the image classifier 110 performs categorical classification. In such implementations, the image classifier 110 classifies images into categories. In some implementations, the categories are pre-defined by an operator (e.g., a human operator). In some implementations, the image classifier 110 is trained to identify which category an image belongs to. In some implementations, the image classifier 110 obtains an image as input, and outputs probabilities of the image belonging to different categories. In some implementations, the categories include living room, dining room, bedroom, kitchen, hallway, bathroom, basement, garage, etc.

Figure 2:
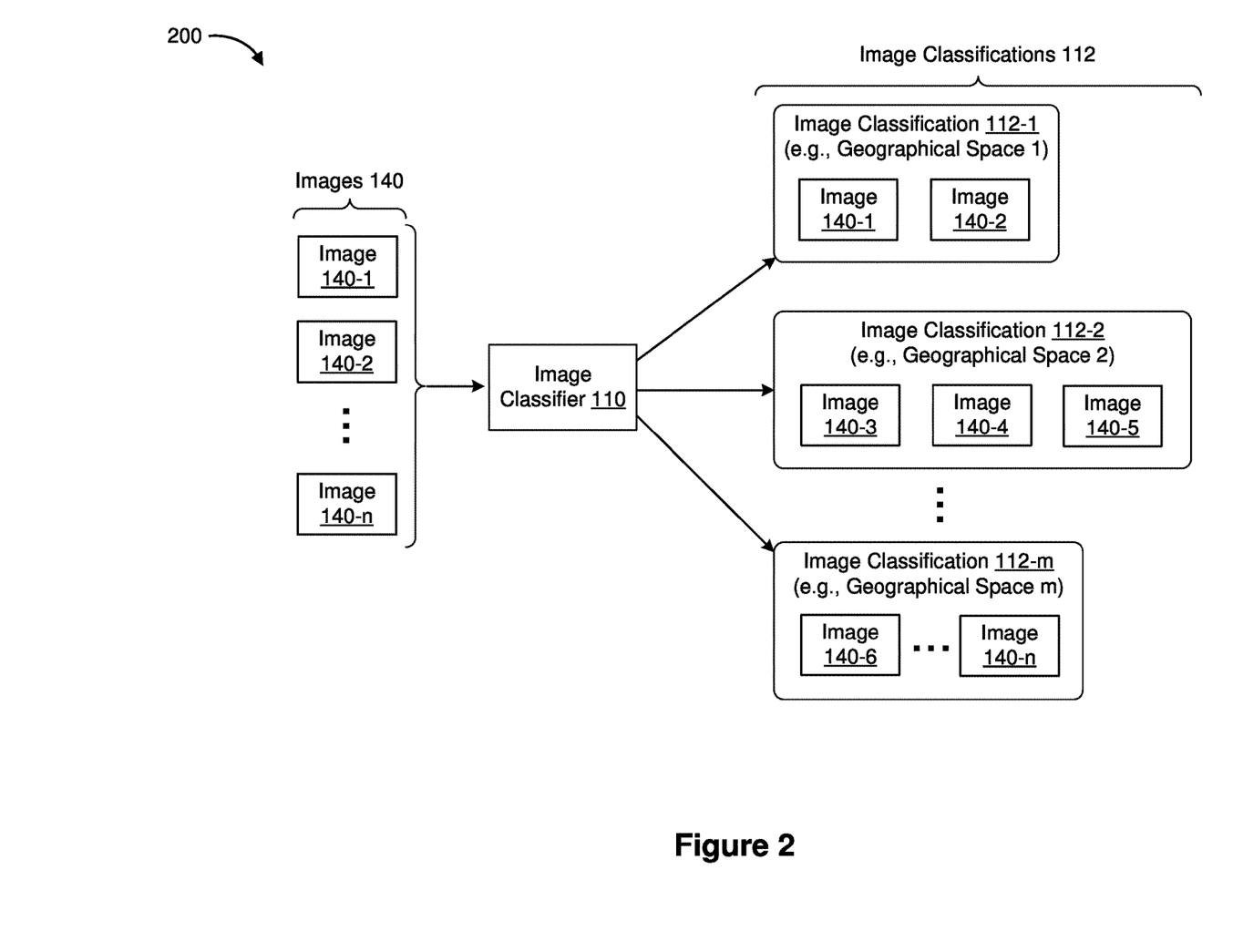
FIGS. 2 and 3 are diagrams of example image classifications in accordance with some implementations.

FIG. 2 is a diagram 200 of example image classifications in accordance with some implementations. In some implementations, the image classifier 110 classifies the images 140 into different image classifications 112 that correspond with respective geographical spaces. In the example of FIG. 2, the image classifier 110 has classified the images 140 into three image classifications 112: a first image classification 112-1 that corresponds to a first geographical space, a second image classification 112-2 that corresponds to a second geographical space, and a third image classification 112-3 that corresponds to a third geographical space. As shown in FIG. 2, the first image 140-1 and the second image 140-2 are in the first image classification 112-1 because the first image 140-1 and the second image 140-2 correspond to the first geographical space. Similarly, a third image 140-3, a fourth image 140-4, and a fifth image 140-5 are in the second image classification 112-2 because the third image 140-3, the fourth image 140-4, and the fifth image 140-5 corresponds to the second geographical space. As shown in FIG. 2, a sixth image 140-6 through to the nth image 140-n are in the mth image classification 112-m because they correspond to the third geographical space.

Figure 3:
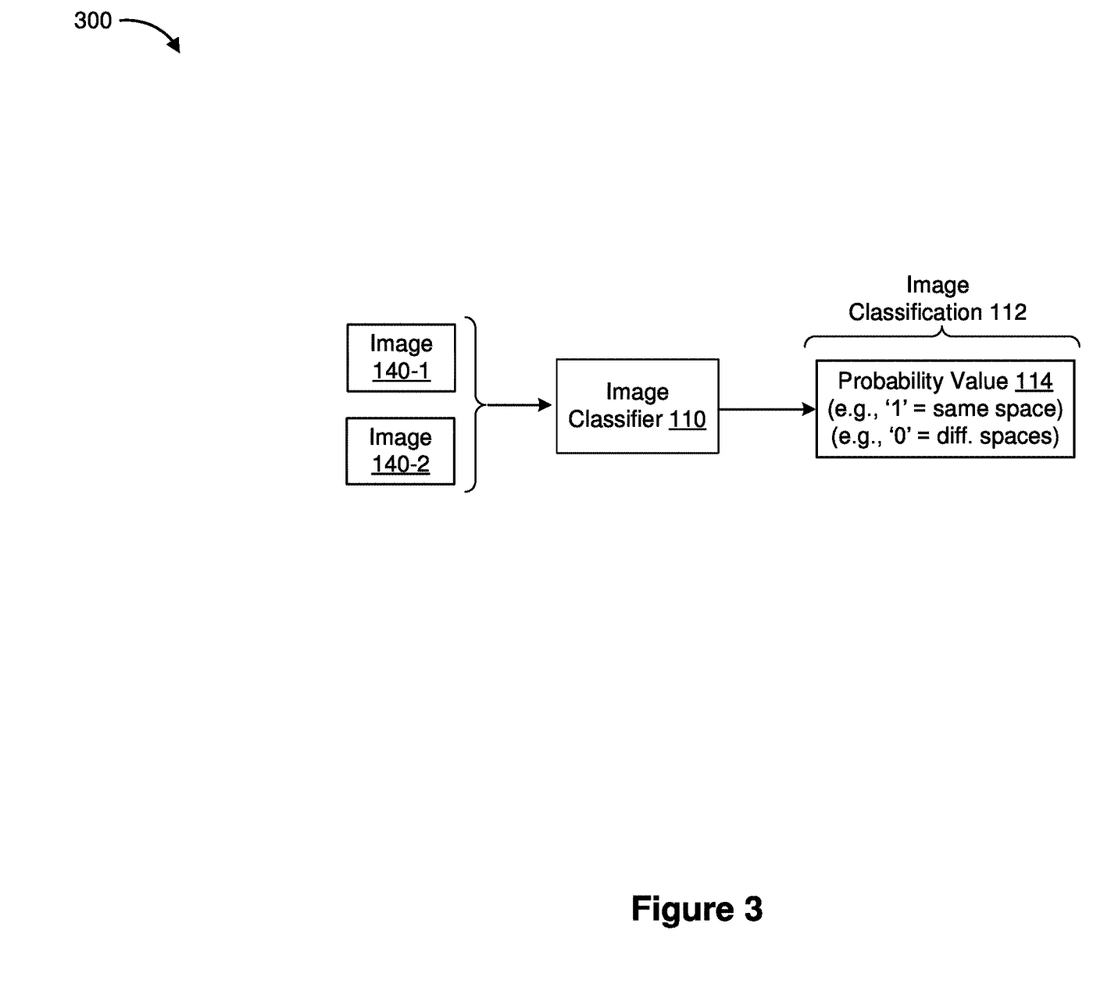

FIG. 3 is another diagram 300 of an example image classification in accordance with some implementations. In some implementations, the image classifier 110 generates probability values for various subset of the images 140. In such implementations, the probability value for a particular subset of the images 140 indicates whether or not the subset of the images 140 correspond to the same geographical space. In the example of FIG. 3, the image classifier 110 generates a probability value 114 for the first image 140-1 and the second image 140-2. The probability value 114 indicates whether or not the first image 140-1 and the second image 140-2 correspond to the same geographical space. In some implementations, if the probability value 114 satisfies a first threshold (e.g., is higher than the first threshold), then the first image 140-1 and the second image 140-2 correspond to the same geographical space. In some implementations, if the probability value 114 breaches a second threshold (e.g., is lower than the second threshold), then the first image 140-1 and the second image 140-2 do not correspond to the same geographical space. In some implementations, the first threshold and the second threshold are different. In some implementations, the first threshold and the second threshold are the same. In some implementations, if the probability value 114 is equal to '1', then the first image 140-1 and the second image 140-2 likely correspond to the same geographical space. In some implementations, if the probability value is equal of '0', then the first image 140-1 and the second image 140-2 likely correspond to different geographical spaces.

Figure 4:
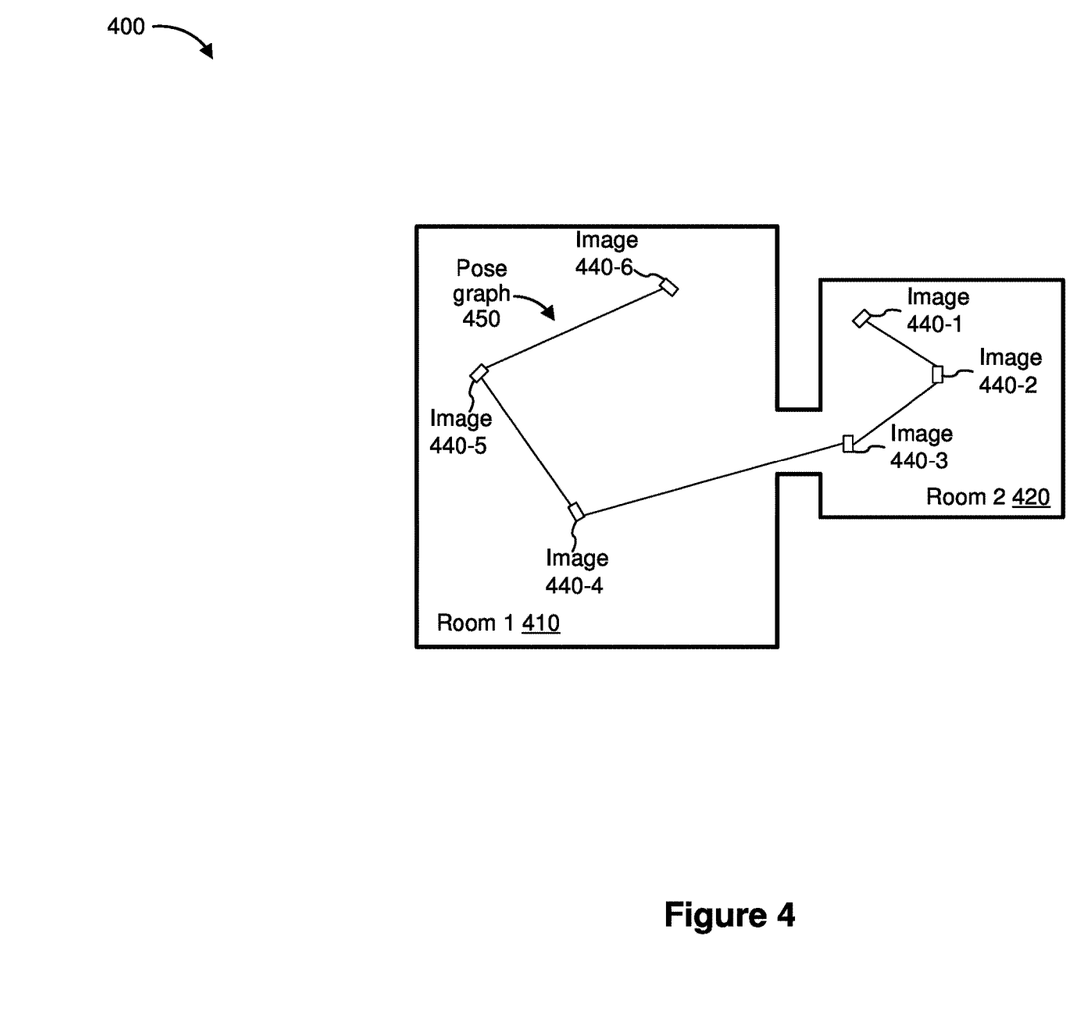
FIGS. 4-6 are diagrams of example geographical spaces in accordance with some implementations.

FIG. 4 is a diagram of an example geographical area 400 in accordance with some implementations. As illustrated in FIG. 4, the geographical area 400 includes a first room 410 and a second room 420. As shown in FIG. 4, a first image 440-1, a second image 440-2, and a third image 440-3 are captured in the second room 420, and a fourth image 440-4, a fifth image 440-5, and a sixth image 440-6 are captured in the first room 410. FIG. 4 also illustrates a pose graph 450 that links the images 440-1 . . . 440-6. Upon obtaining the images 440-1 . . . 440-6, the image classifier 110 (shown in FIGS. 1-3) determines that the first image 440-1, the second image 440-2, and the third image 440-3 correspond to the second room 420, and the fourth image 440-4, the fifth image 440-5, and the sixth image 440-6 correspond to the first room 410. The correspondence establisher 120 (shown in FIG. 1) performs a first correspondence search on the first image 440-1, the second image 440-2, and the third image 440-3, and the model synthesizer 130 (shown in FIG. 1) utilizes results of the first correspondence search in order to synthesize a model of the second room 420. The correspondence establisher 120 performs a second correspondence search on the fourth image 440-4, the fifth image 440-5, and the sixth image 440-6, and the model synthesizer 130 utilizes results of the second correspondence search in order to synthesize a model of the first room 410. In some implementations, the model synthesizer 130 generates the pose graph 450 based on the results from the first correspondence search performed on the images 440-1, 440-2, and 440-3, and the second correspondence search performed on the images 440-4, 440-5, and 440-6.

Figure 5:
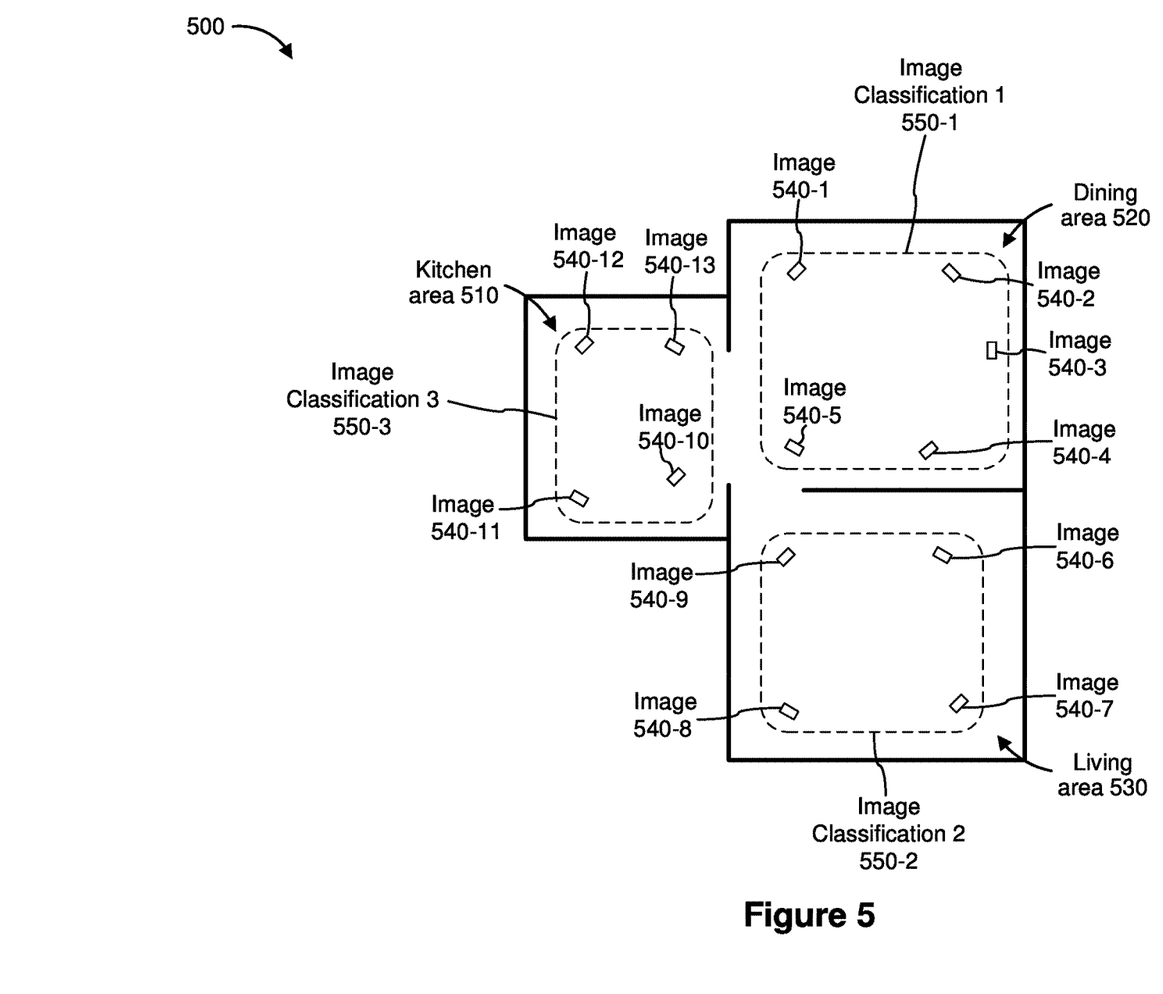

FIG. 5 is a diagram of an example geographical area 500 according to some implementations. As illustrated in FIG. 5, the geographical area 500 includes a kitchen area 510, a dining area 520, and a living area 530. As shown in FIG. 5, images 540-1 . . . 540-5 were captured in the dining area 520, images 540-6 . . . 540-9 were captured in the living area 530, and images 540-10 . . . 540-13 were captured in the kitchen area 510. The image classifier 110 classifies (shown in FIGS. 1-3) the images 540-1 . . . 540-5 into a first image classification 550-1 that corresponds to the dining area 520. The correspondence establisher 120 (shown in FIG. 1) establishes correspondences between the images 540-1 . . . 540-5, and the model synthesizer 130 (shown in FIG. 1) synthesizes a model of the dining area 520 based on the correspondences between the images 540-1 . . . 540-5. The image classifier 110 classifies the images 540-6 . . . 540-9 into a second image classification 550-2 that corresponds to the living area 530. The correspondence establisher 120 establishes correspondences between the images 540-6 . . . 540-9, and the model synthesizer 130 synthesizes a model of the living area 530 based on the correspondences between the images 540-6 . . . 540-9. The image classifier 110 classifies the images 540-10 . . . 540-13 into a third image classification 550-3 that corresponds to the kitchen area 510. The correspondence establisher 120 establishes correspondences between the images 540-10 . . . 540-13, and the model synthesizer 130 synthesizes a model of the kitchen area 510 based on the correspondences between the images 540-10 . . . 540-13. In some implementations, the model synthesizer 130 combines (e.g., merges) the models of the kitchen area 510, the dining area 520, and the living area 530 to generate a model of the geographical area 500.

Figure 6:
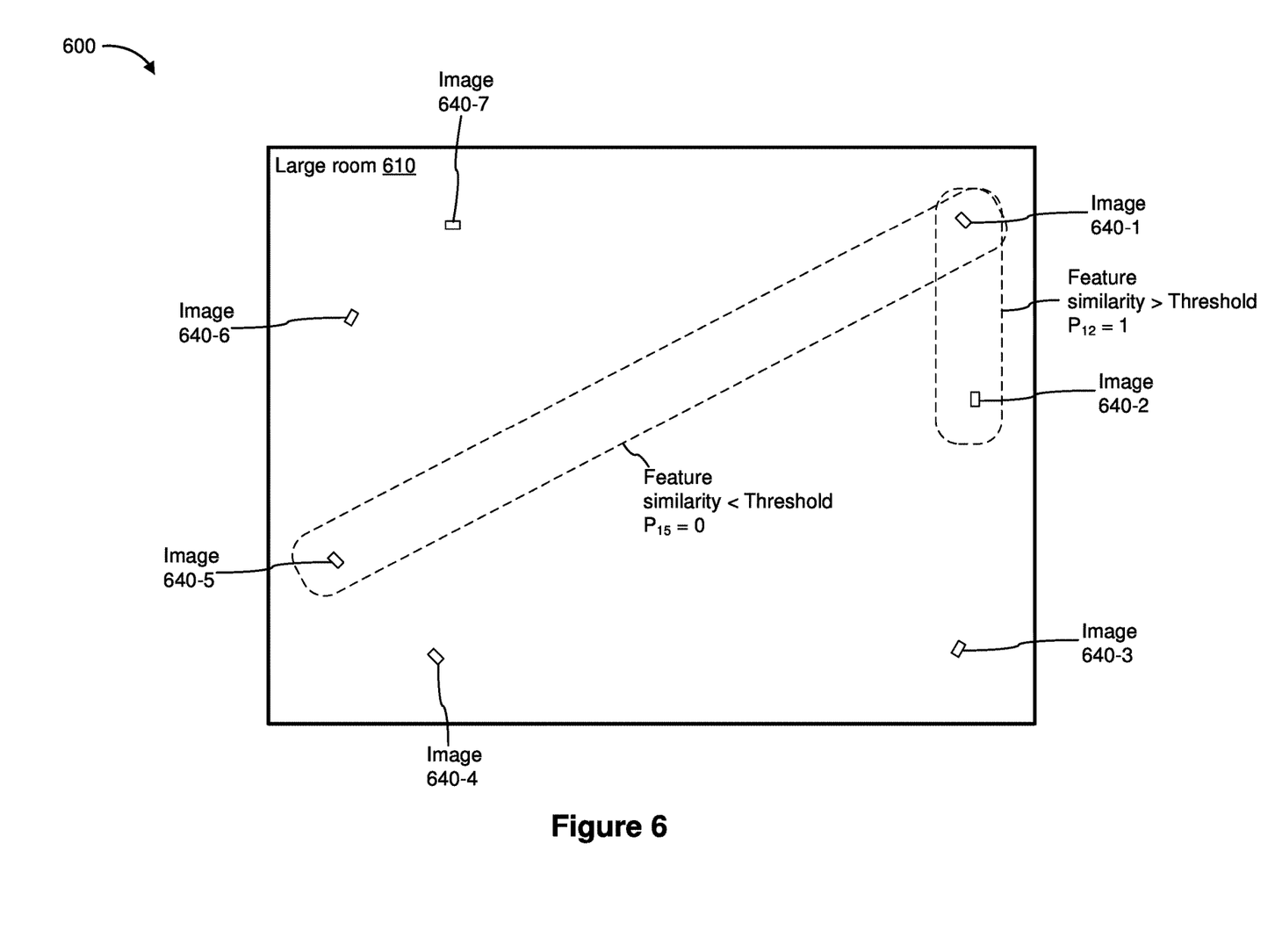

FIG. 6 is a diagram of an example geographical area 600 according to some implementations. In the example of FIG. 6, the geographical area 600 includes a large room 610. In some implementations, the large room 610 is equivalent to multiple rooms. For example, the large room 610 can include a dining area that is equivalent to a dining room, a living area that is equivalent to a living room, and a kitchen area that is equivalent to a kitchen. As shown in FIG. 6, a first image 640-1, a second image 640-2, a third image 640-3, a fourth image 640-4, a fifth image 640-5, and a sixth image 640-6 were captured in the large room 610. In some implementations, the image classifier 110 (shown in FIGS. 1-3) assigns probability values for various subsets of images (e.g., for various image pairs). In some implementations, the image classifier 110 assigns a probability value to an image pair based on feature similarity between the image pair. In some implementations, the image classifier 110 assigns a probability value of '1' if the feature similarity satisfies a threshold (e.g., the feature similarity is greater than the threshold). In some implementations, the image classifier 110 assigns a probability value of '0' if the feature similarity breaches the threshold (e.g., the feature similarity is less than the threshold). In the example of FIG. 6, the image classifier 110 assigns a probability value of '1' to the image pair of images 640-1 and 640-2 because the feature similarity between the images 640-1 and 640-2 is greater than a threshold. As such, the correspondence establisher 120 performs a correspondence search on the images 640-1 and 640-2. In the example of FIG. 6, the image classifier 110 assigns a probability value of '0' to the image pair of images 640-1 and 640-5 because the feature similarity between the images 640-1 and 640-5 is less than the threshold. As such, the correspondence establisher 120 forgoes performing a correspondence search on the images 640-1 and 640-5.

Figure 7:
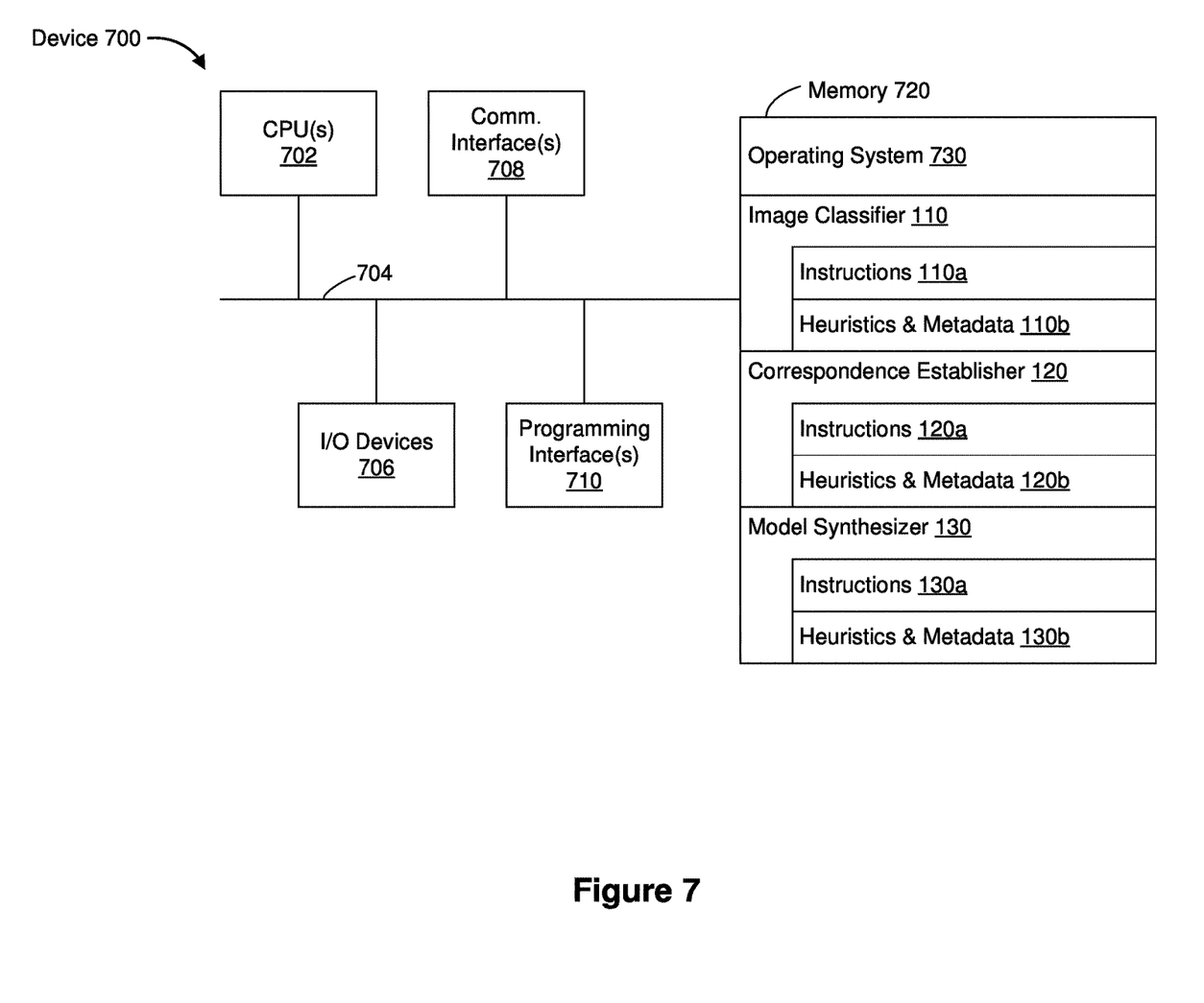
FIG. 7 is a block diagram of an example device in accordance with some implementations.

FIG. 7 is a block diagram of an example device 700 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the device 700 includes one or more processing units 702 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 706, one or more communication interfaces 708 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 710, a memory 720, and one or more communication buses 704 for interconnecting these and various other components.

In some implementations, the one or more communication buses 704 include circuitry that interconnects and controls communications between system components. In some implementations, the one or more I/O devices 706 include at least one of a keyboard, a mouse, a touchpad, a joystick, one or more microphones, one or more speakers, one or more image sensors (e.g., one or more cameras, for example, a front-facing camera), one or more displays (e.g., one or more CGR displays), and/or the like.

The memory 720 includes high-speed random-access memory, such as dynamic random-access memory (DRAM), static random-access memory (SRAM), double-data-rate random-access memory (DDR RAM), or other random-access solid-state memory devices. In some implementations, the memory 720 includes non-volatile memory, such as one or more magnetic disk storage devices, optical disk storage devices, flash memory devices, or other non-volatile solid-state storage devices. The memory 720 optionally includes one or more storage devices remotely located from the one or more processing units 702. The memory 720 comprises a non-transitory computer readable storage medium. In some implementations, the memory 720 or the non-transitory computer readable storage medium of the memory 720 stores the following programs, modules and data structures, or a subset thereof including an optional operating system 730, the image classifier 110, the correspondence establisher 120, and the model synthesizer 130. In some implementations, the image classifier 110, the correspondence establisher 120 and the model synthesizer 130 collectively form a CGR experience module that manages and coordinates one or more CGR experiences for one or more users (e.g., a single CGR experience for one or more users, or multiple CGR experiences for respective groups of one or more users).

The operating system 730 includes procedures for handling various basic system services and for performing hardware dependent tasks.

As described herein, in various implementations, the image classifier 110 obtains a set of images and determines whether or not the set of images correspond to a geographical space. To that end, the image classifier 110 includes instructions 110a, and heuristics and metadata 110b. As described herein, in various implementations, the correspondence establisher 120 establishes correspondences between a subset of the images that correspond to the same geographical space. To that end, the correspondence establisher includes instructions 120a, and heuristics and metadata 120b. As described herein, in various implementations, the model synthesizer 130 synthesizes a model of the geographical space based on the correspondences between the subset of the images. To that end, the model synthesizer 130 includes instructions 130a, and instructions and heuristics 130b.

Although the image classifier 110, the correspondence establisher 120, and the model synthesizer 130 are shown as residing on a single device (e.g., the device 700), it should be understood that in other implementations, any combination of the image classifier 110, the correspondence establisher 120, and the model synthesizer 130 may be located in separate computing devices.

Moreover, FIG. 7 is intended more as functional description of the various features which be present in a particular implementation as opposed to a structural schematic of the implementations described herein. As recognized by those of ordinary skill in the art, items shown separately could be combined and some items could be separated. For example, some functional blocks shown separately in FIG. 7 could be implemented as a single block and the various functions of single functional blocks could be implemented by one or more functional blocks in various implementations. The actual number of blocks and the division of particular functions and how features are allocated among them will vary from one implementation to another and, in some implementations, depends in part on the particular combination of hardware, software, and/or firmware chosen for a particular implementation.

In various implementations, the device 700 includes a portable electronic device that can be carried by a user. For example, in some implementations, the device 700 includes a smartphone, a tablet, a media player or a laptop. In some implementations, the device 700 includes a desktop computer or a server.

In some implementations, the device 700 includes a head-mountable device (HMD) that can be worn by a user. In some implementations, the HMD includes an integrated display (e.g., a built-in display) that displays a CGR environment. In some implementations, the HMD includes a head-mountable enclosure. In various implementations, the head-mountable enclosure includes an attachment region to which another device with a display can be attached. For example, in some implementations, a portable electronic device such as a smartphone or a tablet can be attached to the head-mountable enclosure. In various implementations, the head-mountable enclosure is shaped to form a receptacle for receiving another device that includes a display (e.g., a smartphone or a tablet). For example, in some implementations, a smartphone or a tablet slides/snaps into or otherwise attaches to the head-mountable enclosure. In some implementations, the display of the device attached to the head-mountable enclosure presents (e.g., displays) the CGR environment.

Figure 8:
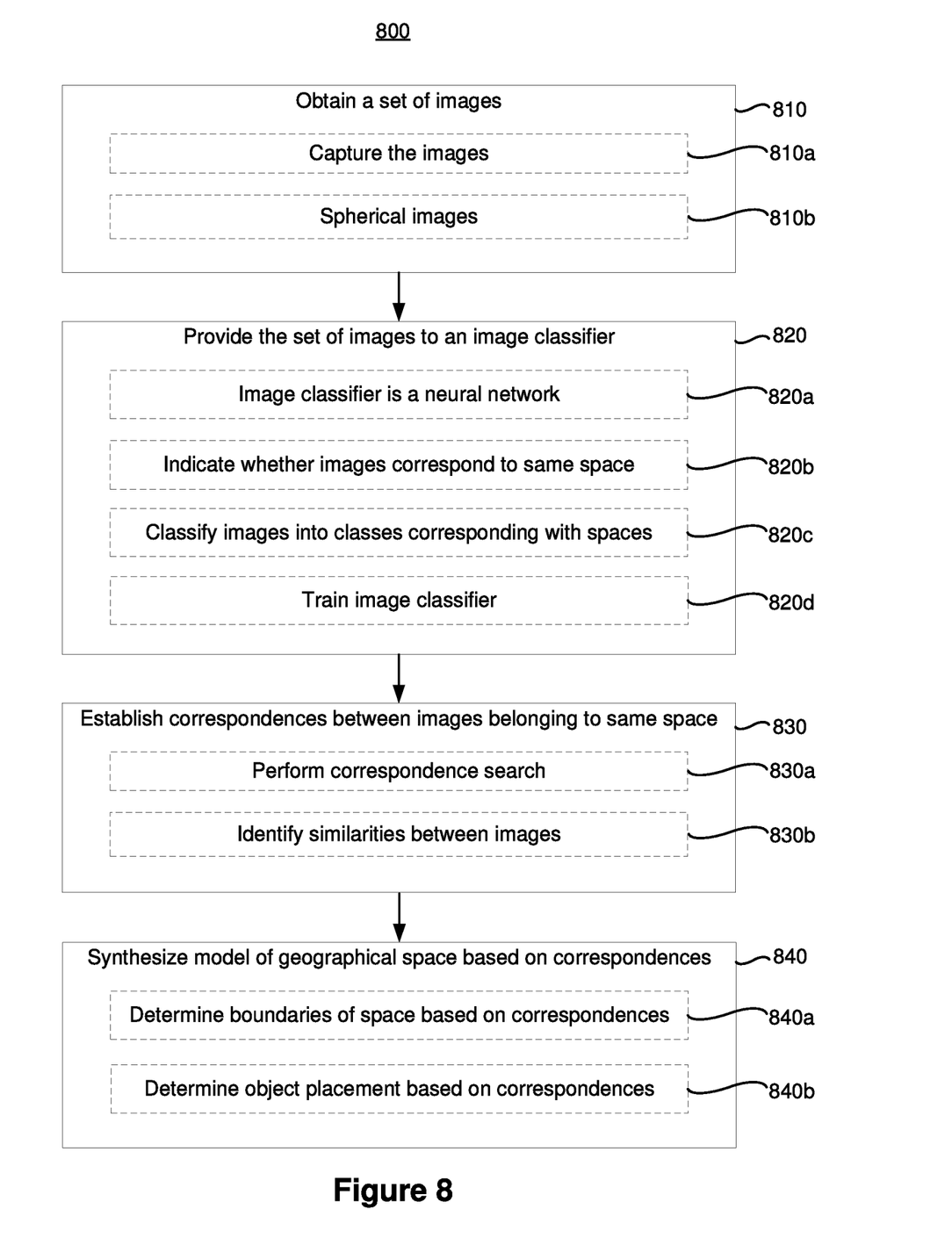
FIG. 8 is a flowchart representation of a method of modeling a geographical space for a CGR experience in accordance with some implementations.

FIG. 8 is a flowchart representation of a method 800 of modeling a geographical space for a CGR experience in accordance with some implementations. In various implementations, the method 800 is performed by a device (e.g., the device 700 of FIG. 7). In some implementations, the method 800 is performed by processing logic, including hardware, firmware, software, or a combination thereof. In some implementations, the method 800 is performed by a processor executing code stored in a non-transitory computer-readable medium (e.g., a memory). Briefly, in various implementations, the method 800 includes obtaining a set of images, providing the set of images to an image classifier that determines whether the set of images correspond to a geographical space, establishing correspondences between at least a subset of the set of images, and synthesizing a model of the geographical space based on the correspondences between the subset of images.

As represented by block 810, in various implementations, the method 800 includes obtaining a set of images (e.g., the images 140 shown in FIG. 1). As represented by block 810a, in some implementations, the device is coupled with a camera, and the method 800 includes capturing the set of images with the camera. In some implementations, the method 800 includes receiving the images from another device that captured the images. In some implementations, the set of images are stored in a memory, and the method 800 includes retrieving the images from the memory.

As represented by block 810b, in some implementations, at least one of the set of images includes a spherical image. In some implementations, all the images in the set of images include spherical images. In various implementations, a spherical image refers to an image that includes a spherical view of an environment. Spherical images are sometimes referred to as 360-degree images. Spherical images are also sometimes referred to as omnidirectional images. In some implementations, a spherical image is synthesized by combining two or more images captured by cameras pointing in different directions. In some implementations, a spherical image is captured by an omnidirectional camera. In some implementations, a spherical image is captured by a 360-degree camera with a field of view that covers approximately the entire sphere. In some implementations, spherical images are represented in a projection such as a Lat-Long projection, equirectangular projection, or cube map projection (e.g., cube mapping).

In some implementations, two spherical images of the same environment and with the same center of projection look substantially different if the camera (e.g., a spherical camera) undergoes a rotation about its center of projection. In some implementations, the image classifier 110 is trained to utilize spherical images that are captured while the spherical camera undergoes rotations about the nodal point, the projection point, the center of perspective, and/or the optical center of the spherical camera. In some implementations, the image classifier 110 is trained for horizontal 2D translations in an image space (e.g. using equirectangular projection), which correspond to 3D rotations about an up-axis (e.g., a vertical axis, for example, a z-axis) of the spherical camera. In some implementations, the method 800 includes augmenting the training data for the image classifier with the transformations described herein.

In some implementations, training the image classifier 110 based on the transformations described herein results in an image classifier 110 that is invariant to various movements (e.g., rotations and/or translations) of the camera. In some implementations, invariance of the image classifier 110 to a transformation means that applying the transformation to the input of the image classifier 110 (e.g. applying the transformation to a spherical image) does not substantially affect the output of the image classifier 110. In some implementations, training the image classifier 110 based on the transformations described herein results in an image classifier 110 that is robust to various movements (e.g., rotations and/or translations) of the camera. In some implementations, robustness of the image classifier 110 to a transformation means that applying the transformation to the input of the image classifier 110 (e.g. applying the transformation to a spherical image) has a dampened effect on the output of the image classifier 110.

As represented by block 820, in various implementations, the method 800 includes providing the set of images to an image classifier that determines whether the set of images correspond to a geographical space. For example, providing the images 140 to the image classifier 110 shown in FIG. 1. As represented by block 820a, in some implementations, the image classifier includes a neural network. In some implementations, the image classifier includes a recurrent neural network (RNN). In some implementations, the neural network includes a convolutional neural network (CNN). In some implementations, the neural network includes an SVM neural network. In some implementations, the image classifier includes a random forest.

As represented by block 820b, in some implementations, the set of images includes a first image and a second image, and the image classifier provides a numerical value indicating a likelihood that the first image and the second image correspond to the same geographical space. For example, as shown in FIG. 3, the image classifier 110 is provided a first image 140-1 and a second image 140-1, and the image classifier 110 provides a probability value 114 that indicates whether the first image 140-1 and the second image 140-2 were captured in the same geographical space. In some implementations, the image classifier outputs a '1' if the set of images correspond to the same geographical space, and a '0' if the images do not correspond to the same geographical space.

As represented by block 820c, in some implementations, the image classifier classifies the set of images into different classes corresponding to respective geographical spaces. For example, as shown in FIG. 2, the image classifier 110 classifies the images 140 into three different image classifications 112-1, 112-2, and 112-3.

As represented by block 820d, in some implementations, the method 800 includes training the image classifier by providing the image classifier training data that includes image pairs and corresponding labels indicating whether or not the images correspond to the same geographical space. In some implementations, the corresponding labels for the image pairs are generated by a human operator. In some implementations, the method 800 includes utilizing reinforcement-based learning to train the image classifier.

As represented by block 830, in some implementations, the method 800 includes establishing correspondences between at least a subset of the set of images in response to the image classifier determining that the subset of images correspond to the geographical space. For example, as shown in FIG. 1, the correspondence establisher 120 establishes correspondences 122 between a subset of the images 140 that correspond to the same geographical space. In some implementations, the method 800 includes forgoing establishing correspondences between another subset of the set of images in response to the image classifier determining that the other subset of images do not correspond to the geographical space. As described herein, forgoing a correspondence search on images that likely correspond to different geographical spaces tends to conserve computing resources and/or reduce processing time.

As represented by block 830a, in some implementations, the method 800 includes performing a correspondence search between at least the subset of images that correspond to the same geographical space. For example, performing a correspondence search on the first image 140-1 and the second image 140-2 shown in FIG. 2 because the first image 140-1 and the second image 140-2 correspond to geographical space 1.

As represented by block 830*b*, in some implementations, the method 800 includes identifying similarities between the subset of images that correspond to the same geographical space. For example, in some implementations, the method 800 includes identifying an object that appears in at least two of the subset of images (e.g., searching for a common object). In some implementations, the method 800 includes identifying an object that appears in each of the subset of images. In some implementations, the method 800 includes identifying similar visual properties in the subset of images, such as identifying similar color temperature, similar floor texture, similar décor, similar, lighting conditions, etc.

As represented by block 840, in some implementations, the method 800 includes synthesizing a model of the geographical space based on the correspondences between the subset of images. As represented by block 840*a*, in some implementations, the method 800 includes determining boundaries of the geographical space based on the correspondences between the subset of images (e.g., determining dimensions of the geographical space). In some implementations, the method 800 includes determining placement of objects (e.g., relative location of various objects) in the geographical space based on the correspondences.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first" "second", etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
    at a device including a non-transitory memory and one or more processors coupled with the non-transitory memory:
        obtaining a set of images;
        providing the set of images to an image classifier that determines whether the set of images correspond to a portion of a room that is being modeled;
        generating, by the image classifier, a first probability value for a first subset of the set of images, wherein the first probability value indicates a likelihood that the first subset corresponds to the portion of the room that is being modeled;
        generating, by the image classifier, a second probability value for a second subset of the set of images, wherein the second probability value indicates a likelihood that the second subset corresponds to the portion of the room that is being modeled;
        establishing correspondences between the first subset of the set of images in response to the first probability value being greater than a threshold, wherein the first subset includes fewer images than the set of images;
        forgoing establishment of correspondences between the second subset of the set of images in response to the second probability value being less than the threshold; and
        synthesizing a model of the portion of the room based on the correspondences between the first subset of the set of images.

2. The method of claim 1, wherein the image classifier includes a neural network.

3. The method of claim 1, wherein the first subset includes a first image and a second image, and wherein the first probability value includes a numerical value indicating a likelihood that the first image and the second image correspond to the portion of the room that is being modeled.

4. The method of claim 1, wherein the image classifier classifies the set of images into different classes corresponding to respective portions of the room or to respective rooms.

5. The method of claim 1, further comprising:
    prior to obtaining the set of images, training the image classifier by providing the image classifier training data that includes image pairs and corresponding labels indicating whether or not the images correspond to a same room or a same portion of a room.

6. The method of claim 1, wherein establishing the correspondences comprises performing a correspondence search between the first subset of the set of images.

7. The method of claim 1, wherein establishing the correspondences comprises identifying an object that appears in at least two of the first subset of the set of images.

8. The method of claim 1, wherein establishing the correspondences comprises identifying similar visual properties in the first subset of the set of images.

9. The method of claim 1, wherein the device is coupled with a camera, and obtaining the set of images includes capturing the set of images with the camera.

10. The method of claim 1, wherein at least one of the set of images includes a spherical image.

11. The method of claim 1, wherein synthesizing the model includes determining boundaries of the portion of the room based on the correspondences between the first subset of the set of images.

12. The method of claim 1, wherein synthesizing the model includes determining placement of objects in the portion of the room based on the correspondences.

13. A device comprising:
one or more processors;
a non-transitory memory; and
one or more programs stored in the non-transitory memory, which, when executed by the one or more processors, cause the device to:
obtain a set of images;
provide the set of images to an image classifier that determines whether the set of images correspond to a portion of a room that is being modeled;
generating, by the image classifier, a first probability value for a first subset of the set of images, wherein the first probability value indicates a likelihood that the first subset corresponds to the portion of the room that is being modeled;
generating, by the image classifier, a second probability value for a second subset of the set of images, wherein the second probability value indicates a likelihood that the second subset corresponds to the portion of the room that is being modeled;
establish correspondences between the first subset of the set of images in response to the first probability value being greater than a threshold, wherein the first subset includes fewer images than the set of images;
forgoing establishment of correspondences between the second subset of the set of images in response to the second probability value being less than the threshold; and
synthesize a model of the portion of the room based on the correspondences between the first subset of the set of images.

14. The device of claim 13, wherein the image classifier includes a neural network.

15. The device of claim 13, wherein the first subset includes a first image and a second image, and the first probability value includes a numerical value indicating a likelihood that the first image and the second image correspond to the portion of the room that is being modeled.

16. The device of claim 13, wherein the image classifier classifies the set of images into different classes corresponding to respective portions of the room or to respective rooms.

17. The device of claim 13, wherein the one or more programs further cause the device to:
prior to obtaining the set of images, train the image classifier by providing the image classifier training data that includes image pairs and corresponding labels indicating whether or not the images correspond to a same room or a same portion of a room.

18. The device of claim 13, wherein establishing the correspondences comprises performing a correspondence search between the first subset of the set of images.

19. The device of claim 13, wherein establishing the correspondences comprises identifying an object that appears in at least two of the first subset of the set of images.

20. A non-transitory memory storing one or more programs, which, when executed by one or more processors of a device, cause the device to:
obtain a set of images;
provide the set of images to an image classifier that determines whether the set of images correspond to a portion of a room that is being modeled;
generating, by the image classifier, a first probability value for a first subset of the set of images, wherein the first probability value indicates a likelihood that the first subset corresponds to the portion of the room that is being modeled;
generating, by the image classifier, a second probability value for a second subset of the set of images, wherein the second probability value indicates a likelihood that the second subset corresponds to the portion of the room that is being modeled;
establish correspondences between the first subset of the set of images in response to the first probability value being greater than a threshold, wherein the first subset includes fewer images that the set of images;
forgoing establishment of correspondences between the second subset of the set of images in response to the second probability value being less than the threshold; and
synthesize a model of the portion of the room based on the correspondences between the first subset of the set of images.

21. The non-transitory memory of claim 20, wherein establishing the correspondences comprises identifying similar visual properties in the first subset of the set of images.

22. The non-transitory memory of claim 20, wherein the device is coupled with a camera, and obtaining the set of images includes capturing the set of images with the camera.

23. The non-transitory memory of claim 20, wherein at least one of the set of images includes a spherical image.

24. The non-transitory memory of claim 20, wherein synthesizing the model includes determining boundaries of the portion of the room based on the correspondences between the first subset of the set of images.

25. The non-transitory memory of claim 20, wherein synthesizing the model includes determining placement of objects in the portion of the room based on the correspondences.

* * * * *